US006489020B1

(12) United States Patent
Caruthers, Jr. et al.

(10) Patent No.: US 6,489,020 B1
(45) Date of Patent: Dec. 3, 2002

(54) POLYANALINE AND CARBON BLACK FILLED POLYIMIDE INTERMEDIATE TRANSFER COMPONENTS

(75) Inventors: Edward B. Caruthers, Jr., Rochester, NY (US); Santokh S. Badesha, Pittsford, NY (US); Edward L. Schlueter, Jr., Rochester, NY (US); Gerald M. Fletcher, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/698,656

(22) Filed: Oct. 27, 2000

(51) Int. Cl.[7] ........................ B32B 27/08; B32B 27/18; B32B 27/20; B32B 27/28; B32B 27/32

(52) U.S. Cl. ...................... 428/327; 428/421; 428/422; 428/473.5; 428/323; 428/328; 399/297; 399/302; 399/308; 399/310; 399/313

(58) Field of Search ................................ 428/421, 422, 428/473.5, 323, 328, 327; 399/297, 302, 308, 310, 313

(56) References Cited

U.S. PATENT DOCUMENTS

| | | | | | |
|---|---|---|---|---|---|
| 5,196,144 | A | * | 3/1993 | Smith et al. | 252/500 |
| 5,298,956 | A | | 3/1994 | Mammino et al. | 355/275 |
| 5,470,505 | A | * | 11/1995 | Smith et al. | 252/500 |
| 5,876,636 | A | | 3/1999 | Schlueter, Jr. et al. | 252/520 |
| 5,995,796 | A | | 11/1999 | Schlueter, Jr. et al. | 399/313 |
| 6,245,402 | B1 | * | 6/2001 | Schlueter, Jr. et al. | 428/58 |
| 6,261,659 | B1 | * | 7/2001 | Fletcher et al. | 428/58 |
| 6,311,036 | B1 | * | 10/2001 | Jia et al. | 399/302 |

FOREIGN PATENT DOCUMENTS

| | | | |
|---|---|---|---|
| JP | 09-176329 | * | 7/1997 |

* cited by examiner

*Primary Examiner*—Vivian Chen
(74) *Attorney, Agent, or Firm*—Annette L. Bade

(57) ABSTRACT

A transfer member having a polyimide substrate with polyaniline and two different carbon black electrically conductive fillers dispersed therein for use in electrostatographic apparatuses.

17 Claims, 6 Drawing Sheets

FIG. 4
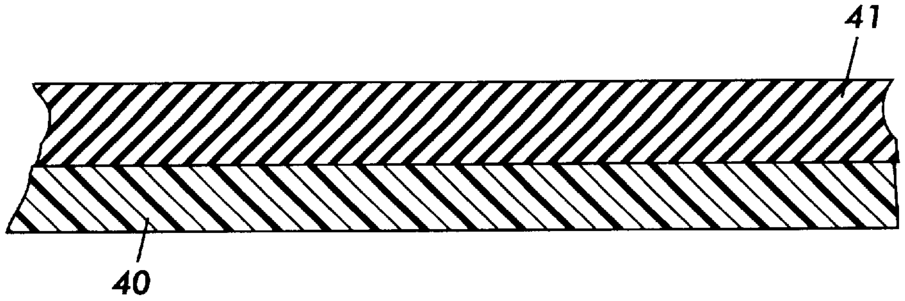
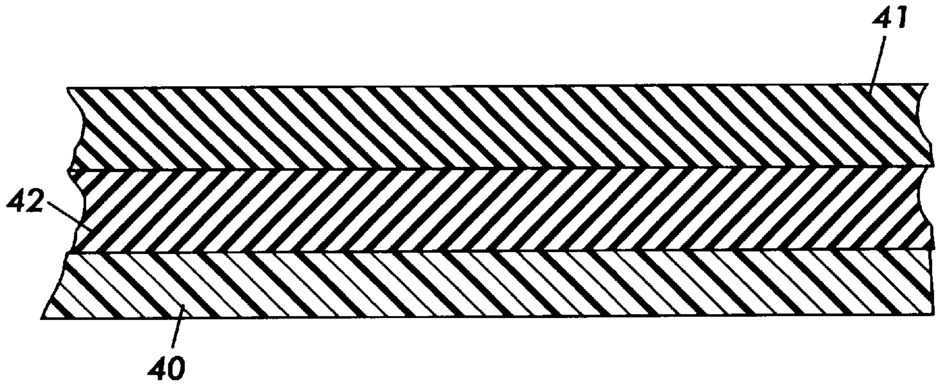
FIG. 5
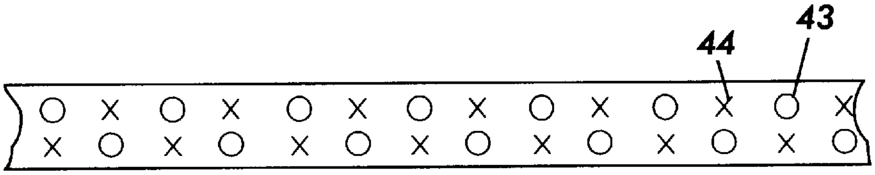
FIG. 6

POLYANALINE AND CARBON BLACK FILLED POLYIMIDE INTERMEDIATE TRANSFER COMPONENTS

BACKGROUND OF THE INVENTION

The present invention relates to transfer components, and more specifically, to intermediate transfer components useful in transferring a developed image in an electrostatographic, including xerographic and digital, machine, from a photoreceptor or another transfer member to a copy substrate or another transfer member. In embodiments of the present invention, there are selected transfer components comprising a layer comprising electrically conductive fillers of polyanaline and carbon black. Also, in embodiments, the transfer member comprises a polyimide substrate. The present invention, in embodiments, allows for the preparation and manufacture of transfer components with resistivity within the desired range for transfer, resulting in excellent electrical properties against a wide variations in transfer fields and enabling the transfer members to be useful at a wide variety of process speeds. The present invention, in embodiments, also allows for a decrease or elimination in pre-transfer air breakdown of the transfer member.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Generally, the electrostatic latent image is developed by bringing a developer mixture into contact therewith. A dry developer mixture usually comprises carrier granules having toner particles adhering triboelectrically thereto. Toner particles are attracted from the carrier granules to the latent image forming a toner powder image thereon. Alternatively, a liquid developer material may be employed. The liquid developer material includes a liquid carrier having toner particles dispersed therein. The liquid developer material is advanced into contact with the electrostatic latent image and the toner particles are deposited thereon in image configuration. After the toner particles have been deposited on the photoconductive surface, in image configuration, they are transferred to a copy sheet. However, when a liquid developer material is employed, the copy sheet is wet with both the toner particles and the liquid carrier. Thus, it is necessary to remove the liquid carrier from the copy sheet. This may be accomplished by drying the copy sheet prior to fusing of the toner image, or relying upon the fusing process to permanently fuse the toner particles to the copy sheet as well as vaporizing the liquid carrier adhering thereto. However, it is desirable to refrain from transferring any liquid carrier to the copy sheet. Therefore, it is advantageous to transfer the developed image to an intermediate transfer component, and subsequently transfer with very high transfer efficiency, the developed image from the intermediate transfer component to a permanent substrate. The toner image is usually fixed or fused upon a support which may be the photosensitive member itself or other support sheet such as plain paper.

In an alternative reproducing apparatus, marking material may be deposited image-wise onto a first image-bearing member. This marking material is then transferred onto a second image-bearing apparatus such as an intermediate transfer member in accordance with an embodiment of this invention. Subsequently, the marking material may be transferred onto a third image-bearing member, typically the final copy sheet, such as paper, transparency, or the like. The marking material of this alternative reproducing apparatus may include a waxy material that is melted and projected onto the first image bearing member, dry toner particles that are electrostatically or acoustically projected onto the first image bearing member, or liquid toner that is partially dried as it is projected from an orifice to the first image bearing member. The marking material may be charged before, during, or after its deposition onto the first image bearing apparatus. The transfers to the second and third image bearing members may use electric fields, differential adhesion and/or the like. This invention provides controlled resistivity for the second image-bearing member and this controlled resistivity is especially beneficial in electric field induced transfer.

U.S. Pat. No. 5,298,956 to Mammino et al. discloses a seamless intermediate transfer member. Polyimide is listed as a possible layer for the intermediate transfer member. A polymer filler such as polyanaline is also disclosed.

U.S. Pat. No. 5,876,636 to Schlueter, Jr. et al. discloses haloelastomer and doped metal oxide compositions. The compositions are disclosed as being useful as layers in xerographic components. Polyanaline and carbon black fillers are given as examples of conductive fillers.

U.S. Pat. No. 5,995,796 to Schlueter, Jr. et al. discloses haloelastomer and doped metal oxide film components useful in xerographic processes. Polyanaline and carbon black fillers are given as examples of conductive fillers.

In scalable tandem color marking, charged toner particles are transferred first to an intermediate transfer belt and then to a final substrate. Some transfers use electric fields to transfer the toner particles. In other machines, the first transfer is electrostatic and the second transfer can combine transfer and fixing. For a given applied voltage, for example on a bias transfer member, the electrical resistivity of an intermediate transfer member determines the voltage drop across the intermediate transfer member and the field acting on the toner particles. A small range of resistivity is desired to give the high transfer fields without pre-transfer air breakdown. It is difficult to manufacture a material transfer layer having this narrow resistivity.

Attempts at achieving this narrow resistivity have led to loading an elastomer transfer substrate with conducting particles. However, this loading typically leads to a large decrease in resistivity when the loading reaches a value called a percolation threshold. The rapid change of resistivity near the percolation threshold makes it difficult to reproducibly manufacture material with the desired resistivity. Small changes in particle concentration, in particle morphology, in particle surface chemistry, or in particle aggregation into larger aggregates, cause large changes in resistivity.

A very conductive intermediate transfer member is not desirable because the high transfer fields cause arcing at the charge deficient spots on the photoconductor. In addition, a very conductive intermediate transfer member results in high pre-transfer fields that cause air breakdown and toner discharge prior to transfer. Conversely, a very insulating intermediate transfer member is not desirable because the result is a large voltage drop across the intermediate transfer member and only a weak field to transfer toner.

Therefore, it is desirable to provide an intermediate transfer member that has a volume resistivity within a desired range necessary for sufficient transfer of toner within a wide variety of process speeds. It is further desirable to provide an intermediate transfer member that possesses a wide latitude against variations in the transfer field.

Attempts at making such a semi-insulating intermediate transfer member having the above desired characteristics have been difficult. Attempts focused on using an insulating plastic or elastomer loaded with conducting particles or with ionic conductors. Control of volume resistivity by loading with ionic conductors is difficult because changes in relative humidity generally lead to changes in resistivity. Sometimes this occurs as soon as the relative humidity changes and sometimes it occurs only after prolonged printing at an extreme corner of the print engine's environmental window (i.e., the range of temperatures and humidities at which the print engine operates).

Therefore, there is still a need for a semi-insulating intermediate transfer member which can be used for transferring a toner image across a wide variety of process speeds, and that possesses a wide latitude against variations in the transfer field.

SUMMARY OF THE INVENTION

Embodiments of the present invention include: a transfer member having a substrate comprising a polyimide having polyanaline and carbon black electrically conductive fillers dispersed therein.

In addition, embodiments include: an image forming apparatus for forming images on a recording medium comprising: a charge-retentive surface to receive an electrostatic latent image thereon; a development component to apply toner to the charge-retentive surface to develop the electrostatic latent image to form a developed image on the charge retentive surface; a transfer component to transfer the developed image from the charge retentive surface to a copy substrate, the transfer member having a substrate comprising a polyimide having polyanaline and carbon black electrically conductive fillers dispersed in the substrate.

Moreover, embodiments include: a transfer member comprising a substrate comprising a polyimide having from about 5 to about 25 percent by weight of total solids polyanaline, and from about 1 to about 10 percent by weight of total solids carbon black electrically conductive fillers dispersed therein, wherein the transfer member has an electrical volume resistivity of from about $10^7$ to about $10^{13}$ ohm-cm.

BRIEF DESCRIPTION OF THE DRAWINGS

For a better understanding of the present invention, reference may be had to the accompanying figures.

FIG. 4 is an illustration of an embodiment of the invention, wherein a two layer transfer film comprising a substrate and an outer layer as described herein is shown.

FIG. 5 is an illustration of an embodiment of the invention, wherein a three layer transfer film having a substrate, an intermediate layer and an outer layer as described herein is shown.

FIG. 6 is an illustration of an embodiment of the invention and demonstrates a transfer member having both carbon black and polyanaline electrically conductive fillers dispersed in the substrate.

DETAILED DESCRIPTION OF THE PRESENT INVENTION

The present invention relates to transfer members comprising a polyimide substrate having electrically conductive fillers dispersed or contained therein. In an embodiment, the electrically conductive fillers comprise polyanaline and carbon black fillers. In a preferred embodiment, the polyimide substrate comprises both carbon black and polyanaline electrically conductive fillers. The transfer member may comprise an outer layer on the substrate, and may also comprise an intermediate layer between the outer layer and the substrate.

Figure 1:
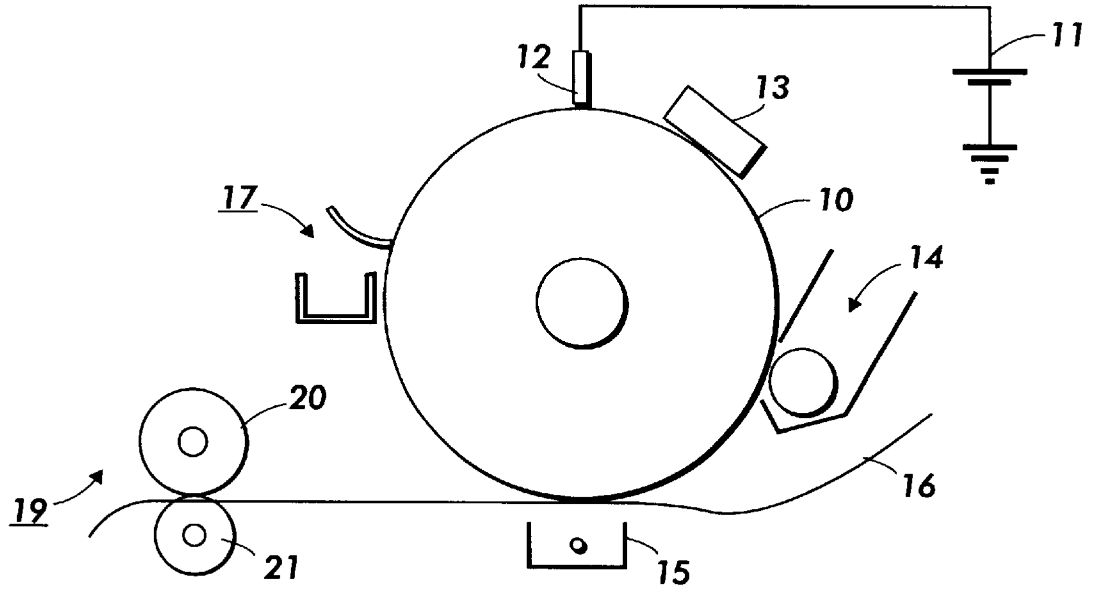
FIG. 1 is a schematic illustration of an image apparatus in accordance with the present invention.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Altematively, the developed image can be transferred to an intermediate transfer member, or bias transfer member, and subsequently transferred to another transfer member or to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application. In the transfix application, the marking material can be, in preferred embodiments, softened by heating before and/or during transfer to the final image receiving medium. In this manner, the image is fixed to the final image-receiving medium by cooling after transfer and a later fusing step is eliminated.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

The transfer members employed for the present invention can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like.

The transfer components of the instant invention may be employed in either an image on image transfer or a tandem transfer of a toned image(s) from the photoreceptor to the intermediate transfer component, or in a transfix system for simultaneous transfer and fusing the transferred and developed latent image to the copy substrate. In an image on image transfer, the color toner images are first deposited on the photoreceptor and all the color toner images are then transferred simultaneously to the intermediate transfer component. In a tandem transfer, the toner image is transferred one color at a time from the photoreceptor to the same area of the intermediate transfer component.

Transfer of the developed image from the imaging member to the intermediate transfer element and transfer of the image from the intermediate transfer element to a copy substrate can be by any suitable technique conventionally used in electrophotography, such as corona transfer, pressure transfer, bias transfer, and combinations of those transfer means, and the like. In the situation of transfer from the intermediate transfer medium to the substrate, transfer methods such as adhesive transfer, wherein the receiving substrate has adhesive characteristics with respect to the developer material, can also be employed. Typical corona transfer entails contacting the deposited toner particles with the substrate and applying an electrostatic charge on the surface of the substrate opposite to the toner particles. A single wire corotron having applied thereto a potential of between about 5,000 and about 8,000 volts provides satisfactory transfer. In a specific process, a corona generating device sprays the back side of the image receiving member with ions to charge it to the proper potential so that it is tacked to the member from which the image is to be transferred and the toner powder image is attracted from the image bearing member to the image receiving member. After transfer, a corona generator charges the receiving member to an opposite polarity to detach the receiving member from the member that originally bore the developed image, whereupon the image receiving member is separated from the member that originally bore the image.

For color imaging, typically, four or more image forming devices are used, one for each color to be printed. The colors may be cyan, magenta, yellow and black, or may be a hexachrome set of process colors, and may also include one or more spot colors, and/or a vamish. The image forming devices may each comprise an image receiving member in the form of a photoreceptor of other image receiving member. The intermediate transfer member of an embodiment of the present invention is supported for movement in an endless path such that incremental portions thereof move past the image forming components for transfer of an image from each of the image receiving members. Each image forming component is positioned adjacent the intermediate transfer member for enabling sequential transfer of different color toner images to the intermediate transfer member in superimposed registration with one another.

The intermediate transfer member moves such that each incremental portion thereof first moves past an image forming component and comes into contact with a developed color image on an image receiving member. A transfer device, which can comprise a corona discharge device, serves to effect transfer of the color component of the image at the area of contact between the receiving member and the intermediate transfer member. In a like fashion, image components of colors such as red, blue, brown, green, orange, magenta, cyan, yellow and black, corresponding to the original document also can be formed on the intermediate transfer member one color on top of the other to produce a full color image.

A transfer sheet or copy sheet is moved into contact with the toner image on the intermediate transfer member. A bias transfer member may be used to provide good contact between the sheet and the toner image at the transfer station. A corona transfer device also can be provided for assisting the bias transfer member in effecting image transfer. These imaging steps can occur simultaneously at different incremental portions of the intermediate transfer member. Further details of the transfer method employed herein are set forth in U.S. Pat. No. 5,298,956 to Mammino, the disclosure of which is hereby incorporated by reference in its entirety.

The intermediate transfer member herein can be employed in various devices including, but not limited to, devices described in U.S. Pat. Nos. 3,893,761; 4,531,825; 4,684,238; 4,690,539; 5,119,140; and 5,099,286; the disclosure of all of which are hereby incorporated by reference in their entirety.

Figure 2:
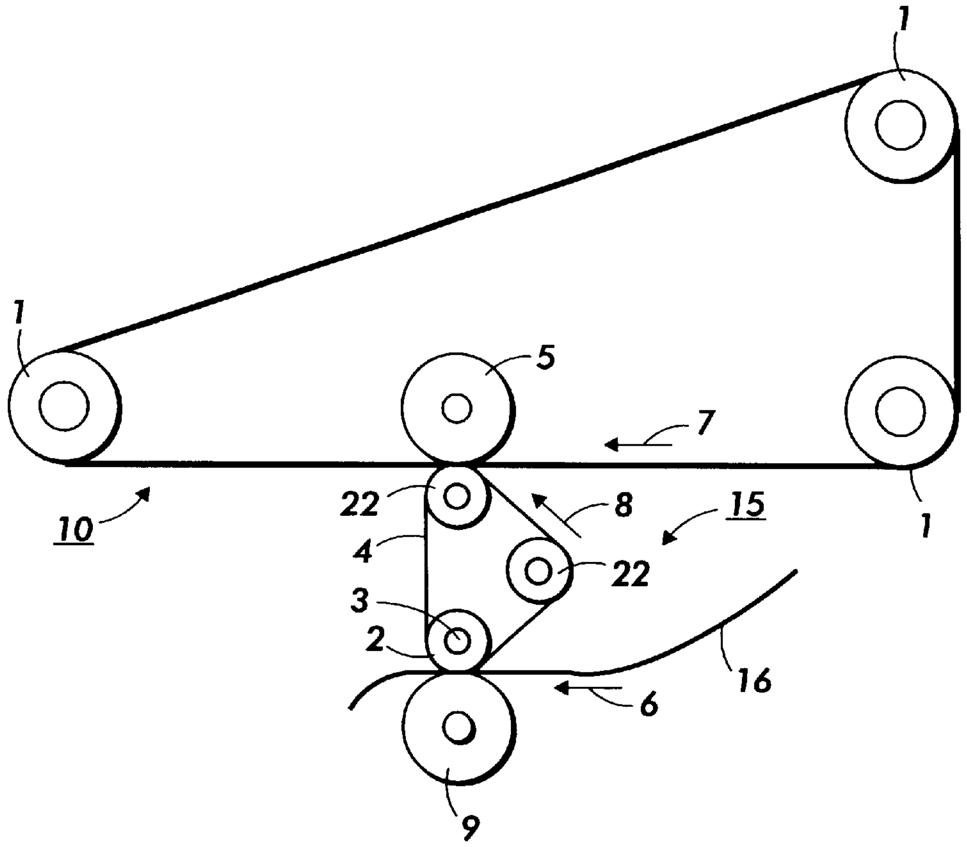
FIG. 2 is an illustration of an embodiment of the present invention, and represents a transfix member.

Transfer and fusing may occur simultaneously in a transfix configuration. As shown in FIG. 2, a transfer apparatus 15 is depicted as transfix belt 4 being held in position by driver rollers 22 and heated roller 2. Heated roller 2 comprises a heater element 3. Transfix belt 4 is driven by driving rollers 22 in the direction of arrow 8. The developed image from photoreceptor 10 (which is driven in direction 7 by rollers 1) is transferred to transfix belt 4 when contact with photoreceptor 10 and belt 4 occurs. Pressure roller 5 aids in transfer of the developed image from photoreceptor 10 to transfix belt 4. The transferred image is subsequently transferred to copy substrate 16 and simultaneously fixed to copy substrate 16 by passing the copy substrate 16 between belt 4 (containing the developed image) and pressure roller 9. A nip is formed by heated roller 2 with heating element 3 contained therein and pressure roller 9. Copy substrate 16 passes through the nip formed by heated roller 2 and pressure roller 9, and simultaneous transfer and fusing of the developed image to the copy substrate 16 occurs.

Figure 3:
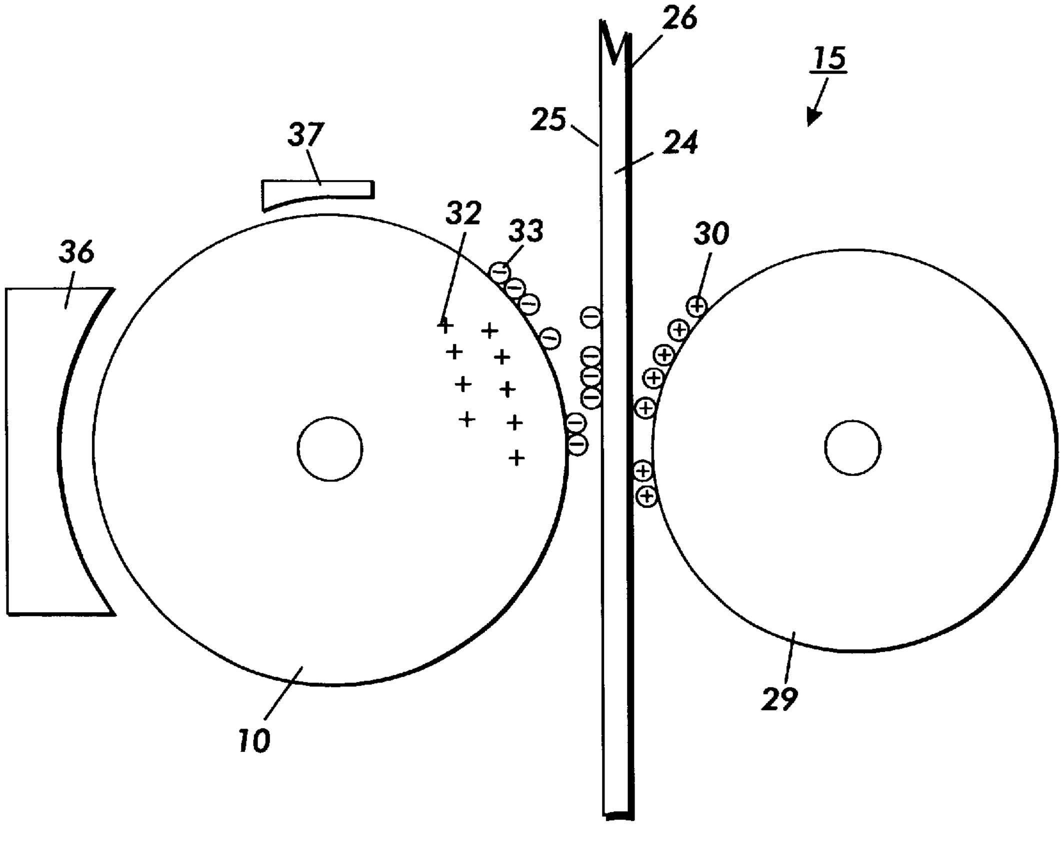
FIG. 3 is a schematic view of an image development system containing an intermediate transfer member.

FIG. 3 demonstrates another embodiment of the present invention and depicts a transfer apparatus 15 comprising an intermediate transfer member 24 positioned between an imaging member 10 and a transfer roller 29. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 3, each image being transferred is formed on the imaging drum by image forming station 36. Each of these images is then developed at developing station 37 and transferred to intermediate transfer member 24. Each of the images may be formed on the photoreceptor drum 10 and developed sequentially and then transferred to the intermediate transfer member 24. In an alternative method, each image may be formed on the photoreceptor drum 10, developed, and transferred in registration to the intermediate transfer member 24. In a preferred embodiment of the invention, the multi-image system is a color copying system. In this color copying system, each color of an image being copied is formed on the photoreceptor drum. Each color image is developed and transferred to the intermediate transfer member 24. As above, each of the colored images may be formed on the drum 10 and developed sequentially and then transferred to the intermediate transfer member 24. In the alternative method, each color of an image may be formed on the photoreceptor drum 10, developed, and transferred in registration to the intermediate transfer member 24.

After latent image forming station 36 has formed the latent image on the photoreceptor drum 10 and the latent image of the photoreceptor has been developed at developing station 37, the charged toner particles 33 from the developing station 37 are attracted and held by the photoreceptor drum 10 because the photoreceptor drum 10 possesses a charge 32 opposite to that of the toner particles 33. In FIG. 3, the toner particles are shown as negatively charged and the photoreceptor drum 10 is shown as positively charged. These charges can be reversed, depending on the nature of the toner and the machinery being used.

A biased transfer roller 29 positioned opposite the photoreceptor drum 10 has a higher voltage than the surface of the photoreceptor drum 10. As shown in FIG. 3, biased transfer roller 29 charges the backside 26 of intermediate transfer member 24 with a positive charge. In an alternative embodiment of the invention, a corona or any other charging mechanism may be used to charge the backside 26 of the intermediate transfer member 24.

The negatively charged toner particles 33 are attracted to the front side 25 of the intermediate transfer member 24 by the positive charge 30 on the backside 26 of the intermediate transfer member 24.

The intermediate transfer member may be in the form of a sheet, web or belt as it appears in FIG. 3, or in the form of a roller or other suitable shape. In a preferred embodiment of the invention, the intermediate transfer member is in the form of a belt. In another embodiment of the invention, not shown in the figures, the intermediate transfer member may be in the form of a sheet.

FIG. 4 demonstrates a two-layer configuration of an embodiment of the present invention. Included therein is a substrate 40 and outer layer 41. Preferably, the substrate is comprised of a suitable high elastic modulus material such as a polyimide material. The material should be capable of becoming conductive upon the addition of electrically conductive particles. A polyimide having a high elastic modulus is preferred because the high elastic modulus optimizes the stretch registration and transfer conformance. The polyimide used herein has the advantages of improved flex life and image registration, chemical stability to liquid developer or toner additives, thermal stability for transfix applications and for improved overcoating manufacturing, improved solvent resistance as compared to known materials used for film for transfer components.

Suitable polyimides include those formed from various diamines and dianhydrides, such as poly(amide-imide), polyetherimide, siloxane polyetherimide block copolymer such as, for example, SILTEM STM-1300 available from General Electric, Pittsfield, Mass., and the like. Preferred polyimides include those sold under the name KAPTON® from DuPont, and aromatic polyimides such as those formed by the reacting pyromellitic acid and diaminodiphenylether sold under the tradename KAPTON®-type-HN, available from DuPont. Another suitable polyimide available from DuPont and sold as KAPTON®-Type-FPC-E, is produced by imidization of copolymeric acids such as biphenyltetracarboxylic acid and pyromellitic acid with two aromatic diamines such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy) phenoxy]-hexafluoropropane available as EYMYD type L-20N from Ethyl Corporation, Baton Rouge, La. Other suitable aromatic polyimides include those containing 1,2,1',2'-biphenyltetracarboximide and para-phenylene groups such as UPILEX®-S available from Uniglobe Kisco, Inc., White Planes, N.Y., and those having biphenyltetracarboximide functionality with diphenylether end spacer characterizations such as UPILEX®-R also available from Uniglobe Kisco, Inc. Mixtures of polyimides can also be used.

The polyimide is present in the film in an amount of from about 65 to is about 94 percent by weight of total solids, preferably from about 79 to about 87 percent by weight of total solids. Total solids as used herein includes the total percentage by weight of polymer, conductive fillers and any additives in the layer.

It is preferred that the polyimide contain electrically conductive fillers of two kinds. One kind of preferred filler is an organic polymeric filler such as, for example, polyanaline, polypyrrole, polythiophene, polyacetylene, and the like. A particularly preferred organic filler is a polyanaline filler. The organic filler is present in the substrate in an amount of from about 5 to about 25 and preferably from about 10 to about 15 percent by weight of total solids.

The second kind of preferred filler is a conventional electrically conductive particulate material filler such as, for example, carbon fillers such as carbon black, graphite and the like; doped metal oxide such as doped tin oxide and the like; metals such as copper, iron, magnesium, calcium and the like; and metal oxides such as iron oxide, copper oxide, magnesium dioxide, calcium hydroxide, and the like.

In a preferred embodiment, the particulate filler is a carbon filler. Examples of suitable carbon fillers include carbon black, graphite, fluorinated carbon, and the like. The carbon filler is present in the substrate in an amount of from about 1 to about 10, and preferably from about 3 to about 6 percent by weight of total solids.

Carbon black systems can be established to make polymers conductive. By use of a combination of carbon blacks as disclosed herein, the conductivity of a polymer can be tailored to a desired conductivity which is unexpectedly higher (resistance unexpectedly lower) than what would be expected. For example, the inventors have demonstrated that by dispersing graphite in a polymer layer (e.g., fluoroelastomer, 4.5 by 9 inches), the resistance of the layer is about 30 ohms. By dispersing a non-graphite carbon black such as BLACK PEARL® 2000 in a polymer (e.g., fluoroelastomer, 4.5 by 9 inches), the resistance of the layer was determined to be 1270 ohms. By combining a mixed carbon black system comprising a graphite carbon black and a non-graphite carbon black, and dispersing the mixed carbon black system into a polymer, the inventors found the resistance of the layer to be 10 ohms, which is unexpectedly lower than both conductivities.

The phrase "more than one variety of carbon black" or "carbon black of a different variety" as used herein, refers to using carbon blacks with different particle geometries, carbon blacks with different resistivities or conductivities, carbon blacks with different chemistries, carbon blacks with different surface additives, and/or carbon blacks with different particle sizes. The use of such carbon systems provides a coating with controlled conductivity within a desired resistivity range that is virtually unaffected by changes in temperature, relative humidity and relatively small changes in filler loadings. Also, resistive heating layers using carbon systems as defined herein provide greater thickness control and coating consistency.

In a preferred embodiment, a graphite carbon black is used in combination with a carbon black that is other than graphite, i.e., a non-graphite carbon black. Graphite carbon black is defined as being of crystalline shape, or the crystalline allotropic form of carbon black, and non-graphite carbon black is a finely divided form of carbon black. In graphite, carbon atoms are located in a plane of symmetrical hexagons and there are layers and layers of these planes in graphite. Non-graphite carbon black, as used herein, refers to any carbon black which is not of crystalline allotropic form. Non-graphite carbon black is formed by incomplete combustion of organic substances, such as hydrocarbons. Examples of non-graphite carbon blacks include furnace blacks, channel blacks, thermal blacks, lamp blacks, acetylene blacks, and the like. Structurally, non-graphite carbon blacks consist of bundles of parallel orientated graphite planes at a distance of between 3.5 to 3.8 angstroms.

Another preferred mixture of carbon black comprises a carbon black or graphite having a particle shape of a sphere, flake, platelet, fiber, whisker, or rectangle used in combination with a carbon black or graphite with a different particle shape, to obtain optimum filler packing and thus optimum conductivities. For example, a graphite having a crystalline shape can be used with a non-graphite carbon black having a shape other than a crystalline shape.

Similarly, by use of relatively small particle size non-graphite carbon blacks with relatively large particle size graphite, the smaller particles "fit" into the packing void areas of the resistive heating layer to improve particle touching. As an example, a graphite carbon black having a relatively large particle size of from about 0.1 micron to about 100 microns, preferably from about 2 to about 10 microns, and particularly preferred of from about 5 to about 10 microns, can be used in combination with a non-graphite carbon black having a relatively small particle size of from about 10 nanometers to about 1 micron, preferably from about 10 nanometers to about 100 nanometers, and particularly preferred from about 10 nanometers to about 80 nanometers.

In another preferred embodiment, it is preferred to mix a first graphite carbon black having a bulk resistivity of from about $10^0$ to about $10^{-5}$ ohms-cm, and preferably from about $10^{-1}$ to about $10^{-4}$ ohms-cm, with a second non-graphite conductive carbon black having a bulk resistivity of from about 104 to about $10^{-2}$ ohms-cm, and preferably from about $10^2$ to about $10^{-1}$ ohms-cm.

A first, preferably graphite, carbon black in an amount of from about 5 to about to about 80, and preferably from about 25 to about 75 percent by weight of a second, preferably non-graphite, carbon black filler, is preferably used in combination with a second conductive carbon black in an amount of from about 1 to about 30, and preferably from about 3 to about 20 percent by weight of the first carbon black filler.

Examples of suitable carbon blacks useful herein include those non-graphite carbon blacks such as KETJEN BLACK® from ARMAK Corp; VULCAN® XC72, VULCAN® XC72, BLACK PEARLS® 2000, and REGAL® 250R available from Cabot Corporation Special Blacks Division; THERMAL BLACK® from RT Van Derbilt, Inc.; Shawinigan Acetylene Blacks available from Chevron Chemical Company; furnace blacks; ENSACO® Carbon Blacks and THERMAX Carbon Blacks available from R.T. Vanderbilt Company, Inc.; those graphites available from Southwestern Graphite of Bumet, Tex., GRAPHITE 56-55 (10 microns, $10^{-1}$ ohm/sq), Graphite FP 428J from Graphite Sale, Graphite 2139, 2939 and 5535 from Superior Graphite, and Graphites M450 and HPM850 from Asburry, and ACCUFLUOR® 2028 and ACCUFLUOR® 2010 available from Allied Signal, Morristown, N.J.

In a particularly preferred embodiment of the invention, a preferred mixture of carbon black comprises non-graphite carbon black such as BLACK PEARL® 2000 which has a nitrogen surface area of 1500 $m^2/g$, an oil absorption of 300 cc/100 g, a non-crystalline shape, a particle size of 12 nanometers, and a density of 9 $lbs/ft^3$, used in combination with a graphite carbon black having a density of from about 1.5 to about 2.25 $lbs/ft^3$, a coefficient of friction of about $0.1\mu$, a crystalline shape, and a particle size of about 10 microns.

Turning now to embodiments of the invention involving layer configurations, FIG. 4 demonstrates an embodiment of the invention and depicts polyimide substrate 40 and outer layer 41.

FIG. 6 demonstrates an alternative embodiment of the invention and depicts polyimide film 40 having electrically conductive fillers 43 (carbon black) and 44 (polyanaline) dispersed or contained within the polyimide film 40.

In another embodiment of the invention, the transfer member is of a three-layer configuration as shown in FIG. 5. In this three layer configuration, the transfer member comprises a polyimide substrate 40 as defined above, and having thereon an adhesive layer 42 positioned on the substrate, and an outer release layer 41 positioned on the intermediate layer. The three-layer configuration works very well with liquid development.

Preferred outer release layers 41 (FIGS. 4 and 5) include low surface energy materials such as TEFLON®-like materials including fluorinated ethylene propylene copolymer (FEP), polytetrafluoroethylene (PTFE), perfluoroalkoxy tetrafluoroethylene (PFA TEFLON®) and other TEFLON®-like materials; silicone materials such as fluorosilicones and silicone rubbers such as Silicone Rubber 552, available from Sampson Coatings, Richmond, Va., (polydimethyl siloxane/dibutyl tin diacetate, 0.45 g DBTDA per 100 grams polydimethyl siloxane rubber mixture, with molecular weight of approximately 3,500); and fluoroelastomers such as those sold under the tradename VITON® such as copolymers and terpolymers of vinylidenefluoride, hexafluoropropylene and tetrafluoroethylene, which are known commercially under various designations as VITON A®, VITON E®, VITON E60C®, VITON E45®, VITON E430®, VITON B 910®, VITON GH®, VITON B50®, VITON E45®, and VITON GF®. The VITON® designation is a Trademark of E.I. DuPont de Nemours, Inc. Two preferred known fluoroelastomers are (1) a class of copolymers of vinylidenefluoride, hexafluoropropylene and tetrafluoroethylene, known commercially as VITON® A, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene and a cure site monomer such as VITON GF® having 35 mole percent of vinylidenefluoride, 34 mole percent of hexafluoropropylene and 29 mole percent of tetrafluoroethylene with 2 percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

Preferred adhesive layers 42 (FIG. 5) include silanes, epoxies and other known adhesives.

The adhesive layer and/or the outer release layer may also comprise a filler such as carbon black, graphite, polymer fillers, metal fillers, metal oxide fillers, and/or doped metal oxide fillers.

Additives can be added to the intermediate transfer member. More specifically, a compatibilizer, wetting agent and/or a conductivity modifier can be added. Such agents can be added to help disperse the carbon black, to adjust the chemical interaction between the carbon black and the host polymer, and/or to control the resistivity of the polyanaline. For example, the carbon black surface may be fluorinated (as it is in ACCUFLUOR® 2028 and ACCUFLUOR® 2010) to help dispersion and modify its resistivity. As another example, phosphoric acid can be added to polyanaline to control its conductivity.

The volume resistivity of the transfer member is from about $10^7$ to about $10^{13}$, and preferably about $10^9$ to about $10^{11}$ ohm-cm. This narrow range of resistivity is semi-insulating and allows for sufficient transfer of a toner image across a wide range of process speeds, without the drawbacks too high conductivity or too much insulation. Specifically, within this narrow range of resistivity, arcing at charge deficient spots and high pre-transfer fields causing air breakdown and toner discharge prior to transfer are both reduced and/or eliminated. Further, with a semi-insulating intermediate transfer member, a large voltage drop across the intermediate transfer member and a weak field to transfer toner is also reduced and/or eliminated. Moreover, with the present semi-insulating intermediate transfer member, drastic and/or immediate changes in resistivity resulting from changes in relative humidity are reduced and/or eliminated.

The circumference and width of the component in a film or belt configuration of from 1 to 4 or more layers will depend on the architecture of the print engine in which it is used. The circumference in typical four color print engines is from about 8 to about 120 inches, preferably from about 10 to about 110 inches, and particularly preferred from about 44 to about 110 inches. The width of the film or belt is from about 8 to about 40 inches, preferably from about 10 to about 36 inches, and particularly preferred from about 10 to about 30 inches. It is preferable that the film be an endless, seamless flexible belt or a seamed flexible belt, which may or may not include puzzle cut seam(s). Examples of such belts are described in U.S. Pat. Nos. 5,487,707; 5,514,436; and U.S. patent application Ser. No. 08/297,203 filed Aug. 29, 1994, the disclosures each of which are incorporated herein by reference in their entirety. A method for manufacturing reinforced seamless belts is set forth in U.S. Pat. No. 5,409,557, the disclosure of which is hereby incorporated by reference in its entirety. Other techniques which can also be used for fabricating films or belts include ultrasonic or impulse welding.

In other machine architectures, it may be advantageous the use a transfer member in the form of a roll. It will be understood that the preferred embodiment involving a combination of polymer host matrix, polyanaline, and one or more carbon black species can be used for such rolls. In a preferred invention, the combination of polymer host matrix, polyanaline and one or more carbon black species would be used as a coating on a conducting cylinder which may be grounded or biased.

In an embodiment comprising outer layers, or intermediate and outer layers, the layer or layers may be deposited on the substrate via well-known coating processes. Known methods for forming the outer layer(s) on the substrate film such as dipping, spraying such as by multiple spray applications of very thin films, casting, flow-coating, web-coating, roll-coating, extrusion, molding, or the like can be used. It is preferred to deposit the layers by spraying such as by multiple spray applications of very thin films, casting, by web coating, by flow-coating and most preferably by laminating.

The thickness of the substrates or coatings as described herein is from about 2 microns to about 200 microns. When polyimide is used as the host polymer, its high strength enables a thinner belt such as, for example from about 50 to about 150 microns, and preferred of from about 75 to about 100 microns.

The following Examples further define and describe embodiments of the present invention. Unless otherwise indicated, all parts and percentages are by weight.

EXAMPLES

Example 1

Measuring Surface Resistivity

The surface resistivity was measured with a Hiresta IP meter and an HR probe. This probe consisted of an outer ring electrode (30 mm inner diameter) and an inner disk electrode (16 mm diameter). A belt sample was placed on a nonconducting surface and the probe was placed on top of the sample. A voltage was applied to the ring electrode and the current from the disk electrode was measured. The surface resistivity in ohms/square was calculated from voltage and current. The volume resistivity was measured by first evaporating gold electrodes, ⅜" in diameter and approximately 100 nm thick on opposite sides of the belt material. A voltage was applied to one electrode. The current from the opposite electrode was then measured. The volume resistivity in ohm-cm was calculated from voltage current, sample thickness and gold electrode area.

Example 2

The Percolation Threshold

The data shown in Tables I and II for VITON® fluoroelastomer films containing various carbon black loadings, demostrates the percolation threshold usually present with carbon loaded polymers. For coated films of VITON® loaded with carbon black (the carbon black is not subjected to fluorination), the lateral resistivity decreases by about eight orders of magnitude as carbon black loading increases from 0 to 2 percent. For blade-coated films of VITON® loaded with ACCUFLUOR® 2010 (fluorinated carbon black), the resistivity decreases about eight orders of magnitude as the carbon black loading increases from 2 percent to 5 percent. For spray-coated films of VITON® loaded with ACCUFLUOR® 2010 (fluorinated carbon black) the decrease in resistivity does not start until the carbon black exceeds 5 percent, and then the resistivity decreases 7 orders of magnitude as the carbon black loading increases from 5 percent to 10 percent. Only the particular case of ACCUFLUOR® 2028 in VITON® shows a more controllable resistivity decrease of 7 orders of magnitude as carbon black loading increases from 15 percent to 35 percent.

this case, the coefficient of humidity expansion (CHE). Films with about 15 weight percent polyanaline and only carbon black particles having relatively high CHE were tested. The results demonstrate that film dimensions increase about 60 parts per million for every 1 percent increase in humidity. The film dimensions then decrease by similar amounts as humidity decreases. By adding about 2.5 volume percent ZELEC®, the CHE is reduced to below 40 ppm./

TABLE I

Effects of carbon black type and coating method on film resistivity.

| Carbon Black | Coating method | No CB | 0.5% CB | 1% CB | 1.5% CB | 2% CB | 3% CB | 4% CB | 5% CB | 6% CB | 8% CB | 10% CB | 20% CB |
|---|---|---|---|---|---|---|---|---|---|---|---|---|---|
| Unfluorinated | Blade | $10^{14}$ | $10^{10}$ | $10^{7}$ | $4 \times 10^{6}$ | $3 \times 10^{5}$ | | | $10^{5}$ | | | | |
| 2010 | Blade | $10^{14}$ | | $10^{14}$ | $10^{14}$ | $2 \times 10^{8}$ | $5 \times 10^{6}$ | | $4 \times 10^{5}$ | | | $2 \times 10^{5}$ | |
| 2010 | Spray | $10^{14}$ | | | | | | | $10^{14}$ | $2 \times 10^{12}$ | $8 \times 10^{7}$ | $2 \times 10^{5}$ | $10^{5}$ |

TABLE II

Effects of Accufluor ® 2028 loading on film resistivity.

| Carbon Black | Coating method | Surface resistivity (ohms/square) No CB | 8% CB | 15% CB | 20% CB | 25% CB | 30% CB | 35% CB |
|---|---|---|---|---|---|---|---|---|
| 2028 | Blade | $10^{14}$ | $10^{14}$ | $10^{14}$ | $10^{12}$ | $10^{10}$ | $10^{9}$ | $2 \times 10^{7}$ |

Example 3

Figure 8:
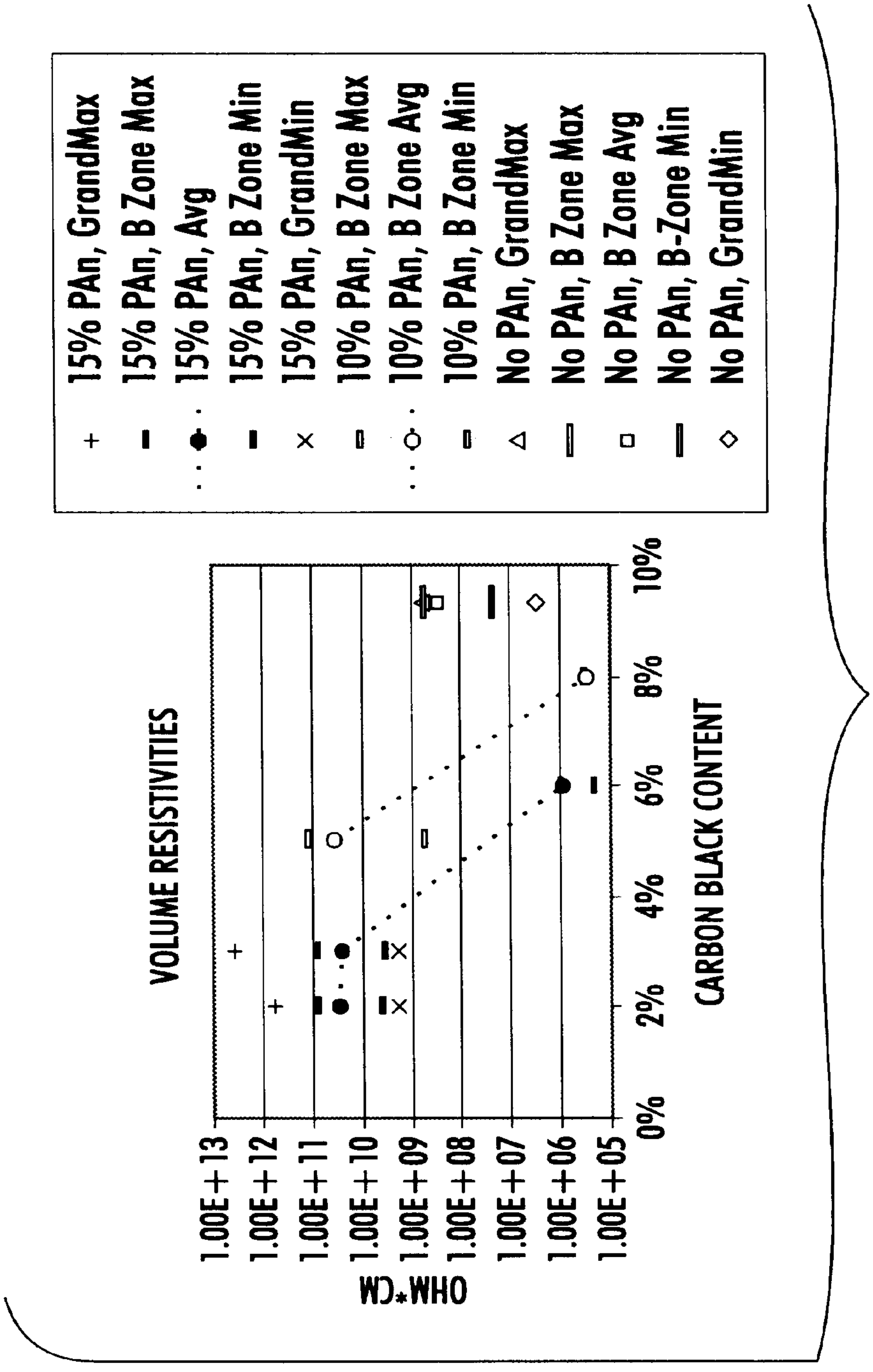
FIG. 8 is a graph showing environmental dependence of volume resistivity versus applied voltage for a preferred embodiment of the invention of a polyimide substrate with about 15 percent polyanaline and about 4.9 percent carbon black.

Unexpected Results of Polyimide Belt with Polyanaline and Carbon Black Fillers Shown by Varying Carbon Black Loadings Sample belts were prepared by using about 15 weight percent polyanaline and various carbon black loadings. These films were tested for resistivity in accordance with the procedures outlined in Example 1. FIG. 8 shows that, for polyimide films of the KAPTON® type, volume resistivity can be adjusted by keeping the polyanaline loadings constant and varying the carbon black loadings. The carbon black in these samples was SB4, from Degussa, not a fluorinated carbon black like ACCUFLUOR®. As FIG. 8 demonstrates, large fluctuations normally characteristic of small changes in carbon black loadings near the percolation threshold are not shown.

Figure 7:
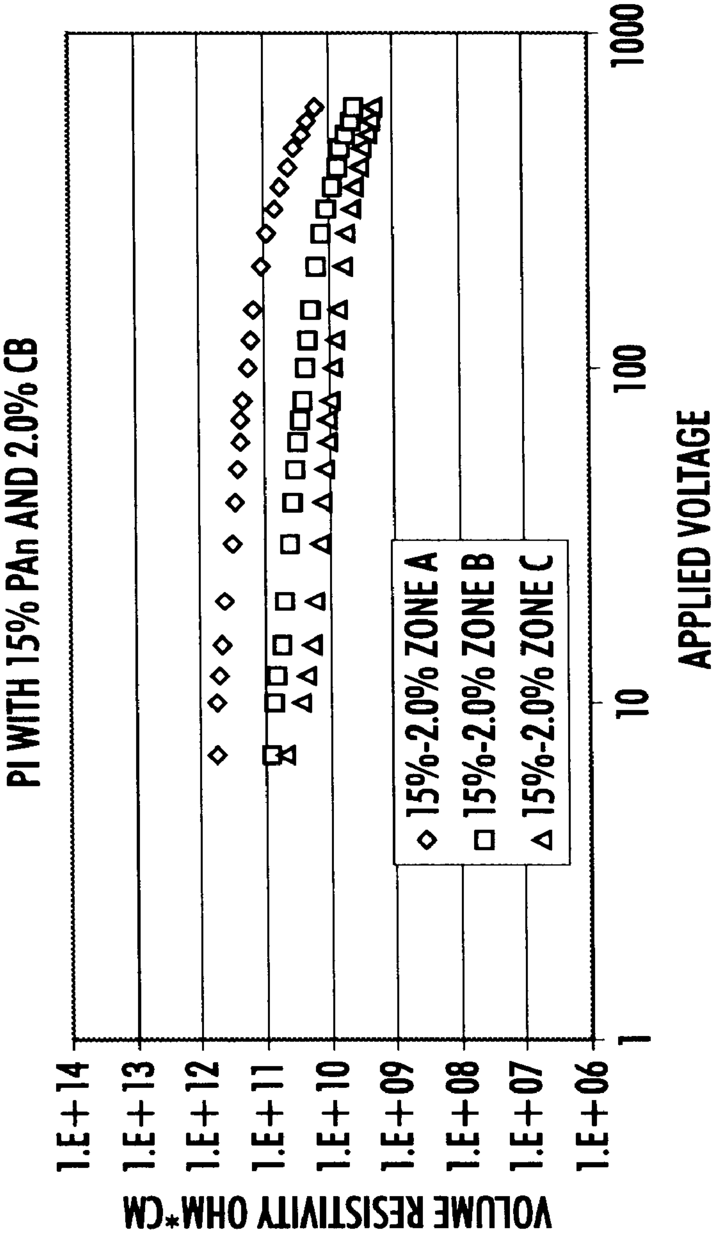
FIG. 7 is a graph of volume resistivity versus carbon black content for polyimide films containing about 15 weight percent polyanaline.

FIG. 7 shows another advantage of films prepared with both polyanaline and carbon black. The figure shows the field-dependence of volume resistivity of one sample, measured at three different environmental conditions. "A-zone" denotes 80° F. and 80 percent relative humidity; B-zone denotes 72° F. and 50 percent relative humidity; and C-zone denotes 60° F. and 20 percent relative humidity. These zones span the range of environments in which xerographic copiers and printers normally operate. FIG. 7 demonstrates that, for compositions falling within embodiments of the present invention, the resistivity does not change greatly with changes in either field or environment.

Example 4

Polyimide Belt with Polyanaline, Carbon Black and Doped Metal Oxide Fillers

A polyimide beft was loaded with polyanaline, carbon black and ZELEC® (an Antimony-doped Tin oxide particle). Table III below shows that a mixed filler system including polyanaline, carbon black and doped metal oxide can be used to adjust other important physical properties, in %RH for a range of carbon black loadings or from about 4 percent to about 6 percent. The use of the mixed filler system reduces the shrinkage and contraction of a beft or roller by approximately from about +/−0.5% to about +/−0.25%. This reduced size fluctuation is particularly important with regard to large beft circumferences and widths.

TABLE III

Effects of Adding Doped Metal Oxide to Polyimide/Polyanaline/Carbon Black System

| Vol % CB | Vol % Zelec ® | CHE (ppm/% RH) |
|---|---|---|
| 4.9% | 0% | 59.6 |
| 6.0% | 0% | 59.9 |
| 7.2% | 0% | 60.6 |
| 5.0% | 1.6% | 51.8 |
| 4.1% | 2.5% | 39.8 |
| 4.9% | 2.5% | 27 |
| 6.0% | 2.5% | 28 |

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims. All amounts are percentages by weight of total solids unless otherwise indicated.

We claim:

1. A transfer member having a substrate comprising a polyimide having polyaniline fillers, graphite fillers, and carbon black fillers other than graphite fillers dispersed in said substrate.

2. A transfer member in accordance with claim 1, wherein said transfer member has a volume resistivity of from about $10^{7}$ to about $10^{13}$ ohms-cm.

3. A transfer member in accordance with claim 2, wherein said volume resistivity is from about $10^9$ to about $10^{11}$ ohms-cm.

4. A transfer member in accordance with claim 1, wherein said polyaniline fillers are present in said substrate in an amount of from about 5 to about 25 percent by weight of total solids.

5. A transfer member in accordance with claim 4, wherein said polyaniline fillers are present in said substrate in an amount of from about 10 to about 15 percent by weight of total solids.

6. A transfer member in accordance with claim 1, wherein said graphite fillers and carbon black fillers other than graphite fillers are present in said substrate in an amount of from about 1 to about 10 percent by weight of total solids.

7. A transfer member in accordance with claim 6, wherein said graphite fillers and carbon black fillers other than graphite fillers are present in said substrate In an amount of from about 3 to about 6 percent by weight of total solids.

8. A transfer member in accordance with claim 1, wherein said polyaniline fillers are present in said substrate in an amount of about 15 percent by weight of total solids, and wherein said graphite fillers and carbon black fillers other than graphite fillers are present in said substrate in an amount of about 2 percent by weight of total solids.

9. A transfer member in accordance with claim 1, wherein said graphite filler has a particle size of from about 0.1 micron to about 100 microns and said carbon black filler other than graphite filler has a particle size of from about 10 nanometers to about 80 nanometers.

10. A transfer member in accordance with claim 1, wherein said graphite filler has a bulk resistivity of from about $10^0$ to about $10^{-5}$ ohms-cm, and said carbon black filler other than graphite filler has a bulk resistivity of from about $10^4$ to about $10^{-2}$ ohms-cm.

11. A transfer member in accordance with claim 1, further comprising a doped metal oxide filler.

12. A transfer member in accordance with claim 11, wherein said doped metal oxide filler is selected from the group consisting of antimony doped tin oxide and indium doped tin oxide.

13. A transfer member in accordance with claim 1, wherein said substrate further comprises an outer layer positioned thereon.

14. A transfer member in accordance with claim 13, wherein said outer layer comprises a material selected from the group consisting of fluorinated ethylene propylene copolymer, perfluoroalkoxy tetrafluoroethylene, polytetrafluoroethylene, silicone rubbers, fluorosilicones, and fluoroelastomers.

15. A transfer member in accordance with claim 13, further comprising an adhesive layer positioned between said substrate and said outer layer.

16. A transfer member in accordance with claim 15, wherein said adhesive layer further comprises an electrically conductive filler.

17. An image forming apparatus for forming images on a recording medium comprising: a charge-retentive surface to receive an electrostatic latent image thereon; a development component to apply toner to said charge-retentive surface to develop said electrostatic latent image to form a developed image on said charge retentive surface; a transfer member to transfer the developed image from said charge retentive surface to a copy substrate, said transfer member comprising a substrate comprising a polyimide having polyaniline, graphite and carbon black other than graphite fillers dispersed in said substrate.

* * * * *